United States Patent [19]

Gerhardt

[11] Patent Number: 5,156,358
[45] Date of Patent: Oct. 20, 1992

[54] AIRCRAFT OUTBOARD CONTROL

[75] Inventor: Heinz A. Gerhardt, Redondo Beach, Calif.

[73] Assignee: Northrop Corporation, Los Angeles, Calif.

[21] Appl. No.: 684,533

[22] Filed: Apr. 11, 1991

[51] Int. Cl.⁵ .............................................. B64C 5/08
[52] U.S. Cl. ................... 244/36; 244/45 R; 244/90 R; 244/91; 244/214; 244/199
[58] Field of Search ................... 244/46, 48, 47, 214, 244/36, 90 R, 91, 45 R, 15, 199

[56] References Cited

U.S. PATENT DOCUMENTS

| | | | |
|---|---|---|---|
| 2,925,233 | 2/1960 | Dunn et al. | 244/91 |
| 2,960,285 | 11/1960 | Lopez | 244/91 |
| 3,310,262 | 3/1967 | Robins et al. | 244/91 |
| 4,093,156 | 6/1978 | Coe, Jr. | 244/46 |
| 4,247,062 | 1/1981 | Brueckner | 244/91 |
| 4,293,110 | 10/1981 | Middleton et al. | |
| 4,466,586 | 8/1984 | Burnham | |
| 4,478,378 | 10/1984 | Capuani | 244/91 |
| 4,485,992 | 12/1984 | Rao | |
| 4,566,657 | 1/1986 | Grow | |
| 4,582,276 | 4/1986 | Gerhardt | |
| 4,598,885 | 7/1986 | Waitzman | 244/45 R |
| 4,722,499 | 2/1988 | Klug | 244/91 |
| 4,729,528 | 3/1988 | Borzachillo | 244/90 R |

OTHER PUBLICATIONS

General Dynamics "Getol Multibased VP Concept" Sep. 1962.
Naca Research Memorandum "Preliminary Study of Airplane Configuration Having Tail Surfaces Outboard of the Wing Tips", William C. Sleeman, Jr., Mar. 24, 1958.

Primary Examiner—Galen Barefoot
Attorney, Agent, or Firm—Terry J. Anderson; Robert B. Block; Karl J. Hoch

[57] ABSTRACT

An outboard control surface for an aircraft. The control surface is operably connected to wing side edges of the aircraft and includes a forward flap and a rearward flap with at least one of the flaps being movable into and out of alignment with the plane of the wing.

16 Claims, 3 Drawing Sheets

AIRCRAFT OUTBOARD CONTROL

BACKGROUND OF THE INVENTION

1. Field of the Invention

The present invention relates to aircraft and, more particularly, to an outboard flight control system for use with an aircraft.

2. Prior Art

U.S. Pat. No. 4,729,528 to Borzachillo discloses auxiliary control flaps at or near the wing tips of an aircraft. U.S. Pat. No. 4,485,992 to Rao discloses control at high angles of attack. U.S. Pat. No. 4,293,110 to Middleton et al. discloses a double-hinged leading edge flap designed to capture the leading edge vortex on highly sweptback wings. U.S. Pat. No. 4,566,657 to Grow discloses a flying wing type aircraft with an air break type flight control. U.S. Pat. No. 4,466,586 to Burnham discloses a plurality of rudder-like surfaces to provide yaw control for a tail-less aircraft. U.S. Pat. No. 4,582,276 to Gerhardt discloses an aerodynamic structure which, when incorporated with the design of a supersonic aircraft, increases the lift/drag ratio. General Dynamics Corporation also has published a description in September 1962 of a GETOL concept of a plane with outboard control horizontal stabilizers rigidly attached to the main wing that do not totally deflect.

A problem existed with the prior art in that no suitable wing was provided for application to supersonic speeds. Basically, a wing of a supersonic aircraft should combine three conflicting attributes. First, the wing should provide high trimmed maximum lift at low subsonic speeds to facilitate takeoff and landing and to achieve high instantaneous maneuverability. Second, the wing should have low drag throughout the applicable speed range for good climb, cruise and sustained maneuver performance. Third, the wing should have superior stability and control characteristics to achieve good flying qualities and aerodynamic balance (trim).

It is therefore an objective of the present invention to provide a new and improved system to help provide these conflicting requirements.

SUMMARY OF THE INVENTION

The foregoing problems are overcome and other advantages are provided by a new and improved aircraft having a wing with outboard control surface sections.

In accordance with one embodiment of the present invention, an aircraft features a main wing, leading edge flaps, trailing edge flaps, and outboard control surfaces. The significant geometric characteristics of the main wing are its short span and long side edges. The leading edge flaps are operably connected to the front portion of the main wing. The trailing edge flaps are operably connected to a rear portion of the main wing. The outboard control surfaces are operably connected to the main wing outboard of and to the rear of the side edges. The outboard control surfaces each include a forward flap and a rearward flap. At least one of the flaps for each of the outboard control surfaces is movable into and out of alignment with the plane of the main wing.

In accordance with another embodiment of the present invention, a tailless aircraft is provided comprising a main wing, leading edge flaps, trailing edge flaps, and outboard control surfaces. The main wing has a front, a rear, and two wing side edges. The leading edge flaps are operably connected to the main wing front. The trailing edge flaps are operably connected to the main wing rear. The outboard control surfaces are operably connected to the main wing proximate each of the wing side edges. The outboard control surfaces each have two movable sections that are movable relative to the main wing in two paths.

In accordance with another embodiment of the present invention, an aircraft is provided comprising a main wing, leading edge flaps, trailing edge flaps, and outboard control surfaces. The leading edge flaps are operably connected to the wing. The trailing edge flaps are operably connected to the wing. The outboard control surfaces are connected to distal ends of the wing and each has two independently movable flaps; a forward flap and a rearward flap. The forward and rearward flaps are movable into and out of alignment with a plane of the wing.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
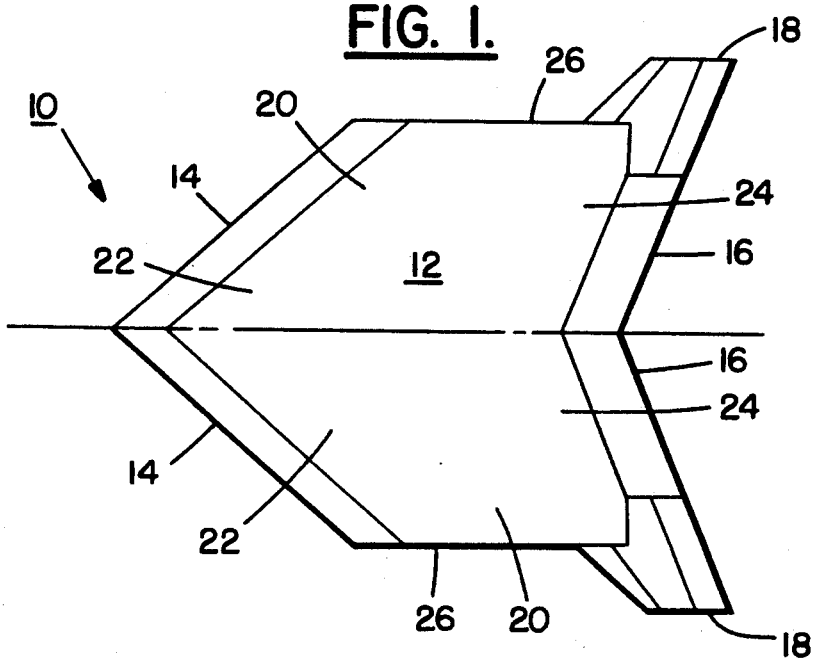
FIG. 1 is a schematic plan top view of an aircraft wing incorporating features of the present invention.

Referring to FIG. 1, there is shown a plan schematic top view of an aircraft wing 10 incorporating features of the present invention. Although the present invention will be described with reference to a flying wing type aircraft as shown in FIG. 1, it should be understood that the present invention can be incorporated into any suitable type of aircraft. In addition, any suitable size, shape and type of elements or materials can be used to incorporate the invention.

The aircraft wing 10 generally comprises a planform main wing 12, leading edge flaps 14, trailing edge flaps 16, and outboard control surfaces 18. The main wing 12 is generally planform and thus establishes the wing of the aircraft. The wing 10 has a general centerline with two laterally extending wing portions 20, each of which have front portions 22, rear portions 24, and wing tips or side edges 26. The leading edge flaps 14 are operably connected to the front portions 22. The trailing edge flaps 16 are operably connected to the rear portions 24. The outboard control surfaces 18 are operably connected to the main wing 12 proximate the rear portion of the wing side edges 26.

Figure 2D:
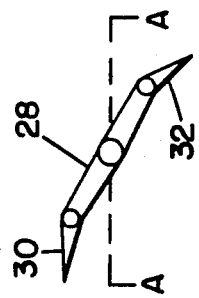
FIGS. 2B, 2C and 2D are diagrammatical sectional views of the outboard control surface shown in FIG. 2A taken along line A—A with the outboard control surface at various different positions.
Figure 3D:
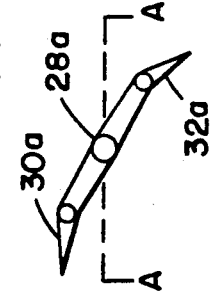
FIGS. 3B, 3C, and 3D are diagrammatical sectional views of the outboard control surface shown in FIG. 3A taken along line A—A at various different positions of the outboard control surface.
Figure 4D:
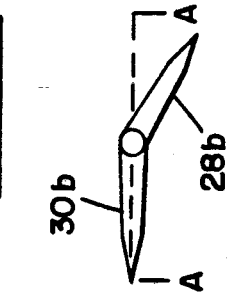
FIGS. 4B, 4C and 4D are diagrammatical sectional views of the outboard control surface shown in FIG. 4A taken along line A—A at various different positions.
Figure 2C:
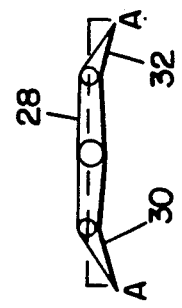
Figure 3C:
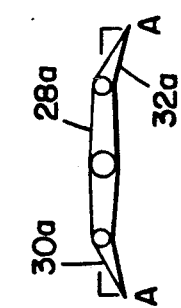
Figure 4C:
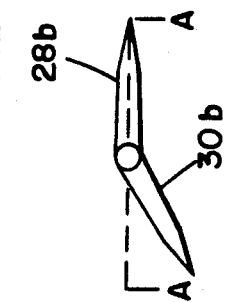
Figure 2B:
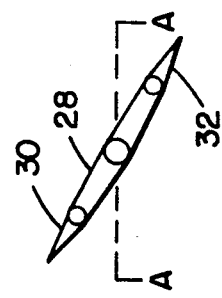
Figure 3B:
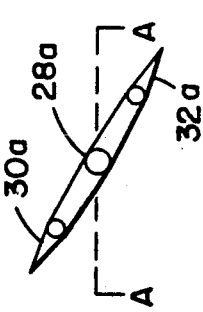
Figure 4B:
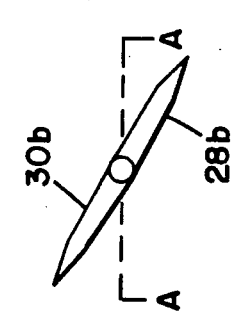
Figure 2A:
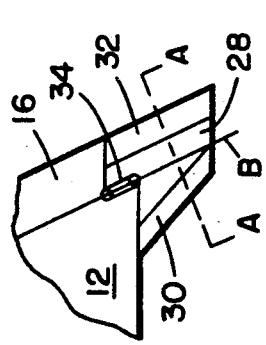
FIG. 2A is a partial schematic view of a wing tip and outboard control surface of the aircraft shown in FIG. 1.
Figure 3A:
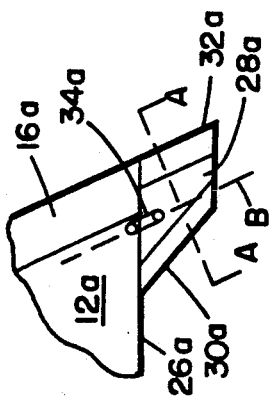
FIG. 3A is a partial schematic view of a wing tip of an aircraft with an alternate embodiment of an outboard control surface incorporating features of the present invention.
Figure 4A:
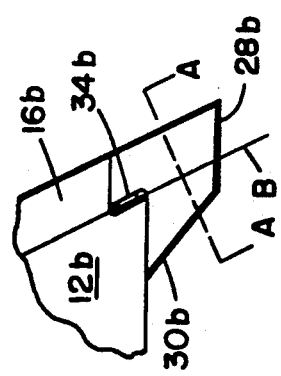
FIG. 4A is a partial schematic view of a wing tip of an aircraft having an alternate embodiment of an outboard control surface incorporating features of the present invention.
Figure 5D:
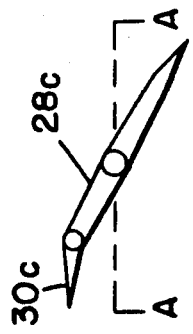
FIGS. 5B, 5C and 5D are diagrammatical sectional views of the outboard control surface shown in FIG. 5A taken along line A—A at various different positions.
Figure 5C:
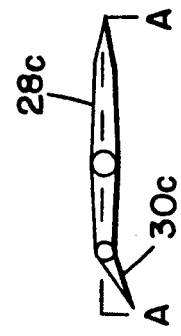
Figure 5B:
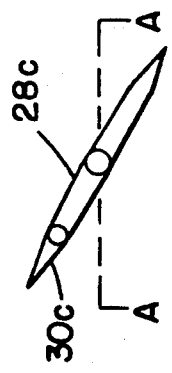
Figure 5A:
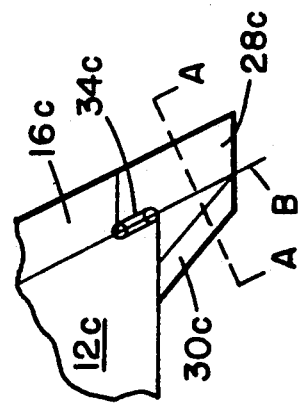
FIG. 5A is a partial schematic view of a wing tip of an aircraft having an alternate embodiment of an outboard control surface incorporating features of the present invention.
Figure 6D:
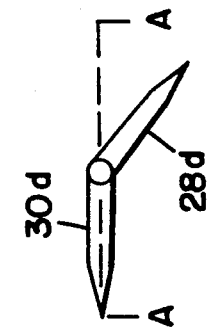
FIGS. 6B, 6C and 6D are diagrammatical sectional of the outboard control surface shown in FIG. 6A taken along line A—A at various different positions.
Figure 6C:
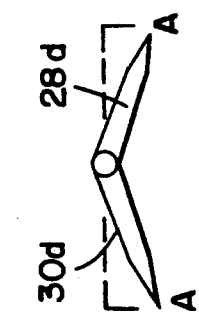
Figure 6B:
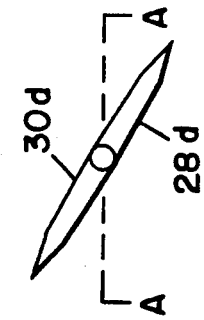
Figure 6A:
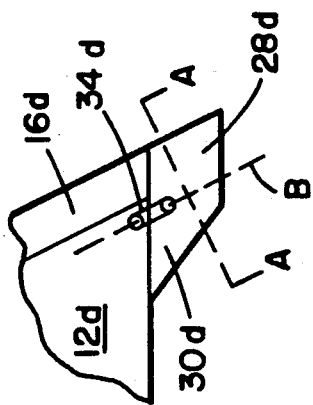
FIG. 6A is a partial schematic view of a wing tip of an aircraft having an alternate embodiment of an outboard control surface incorporating features of the present invention.

Referring now also to FIG. 2A, the outboard control surfaces 18 will be further described. In the embodiment shown, each outboard control surface has a center panel 28, a forward flap 30, a rearward flap 32, and a mount 34 operably connecting the outboard control surface 18 to the main wing 12. In the embodiment shown, the center panel 28 is movably mounted to the main wing 12 along an axis of rotation B that is substantially coaxial with the axis of rotation of the trailing edge flap 16 to the main wing 12. This is accomplished by providing the mount 34 at the rear portion of the main wing 12. The forward and rearward flaps 30 and 32 are independently controllably movable relative to the center panel 28. In the embodiment shown, in addition to extending outward from the wing side edges 26, the outboard control surfaces 18 also partial extend behind the rear portions of the main wing 12. The three surface components 28, 30 and 32 of the outboard control surfaces 18 can be operably positioned relative to the plane of the wings 20 such that either the entire outboard control surface 18 can be deflected or moved relative to the main wing, or only portions thereof can be moved to achieve various desired effects on air flow. As shown in FIG. 2A, the three surface components 28, 30 and 32 can be aligned with the plane of the main wing 12 to act as wing span extensions. FIGS. 2B, 2C and 2D schematically show other component configurations relative to the plane A—A of the main wing 12. These three figures help to illustrate that the panel 28 and flaps 30 and 32 can be deflected both independently of each other and simultaneously relative to each other and relative to the plane A—A of the main wing 12.

The purpose of the outboard control surfaces 18, which can be deflected symmetrically and antisymmetrically, is to provide pitch and roll control, thereby obviating a separate horizontal tail, and to reduce drag due to lift. The outboard control surfaces or tails 18 operate in the rotational flow field of the wing side edge vortex originating at the long main wing side edge. The side edge vortex keeps the flow attached on the control surfaces up to very high angles of attach which keeps them from stalling, preserves their control effectiveness and eliminates any pitch-up tendencies.

At supersonic speeds, the surfaces 18 reduce drag-due-to-lift and trim drag by converting rotational vortex flow momentum into thrust. Positive static stability requires negative trim settings of the outboard control surfaces. Since the surfaces operate in the upwash caused by the side edge vortex, the normal force vector of the surfaces has a thrust component which reduces drag. More negative deflections (needed for longitudinal trim at increased stability) reduce the lift of the surfaces, but increase the thrust component of the lift vector with the result that the trim drag becomes insensitive to static stability margin.

At subsonic and transonic speeds, if positive static longitudinal stability exists, the same vortex energy extraction mechanism is operative. However, at subsonic speeds it is more likely, given state-of-the-art control systems, that the aircraft incorporating the outboard control surface wing 10 is balanced for a moderate negative static stability. In this case the outboard surfaces, as a whole, remain undeflected and act as a wing span extensions thereby reducing drag due to lift (which is proportional to the reciprocal of span squared). Longitudinal balance and trim to the highest angles of attack, including stall, is achieved through downward leading and trailing edge flap deflections on both wing and outboard control surfaces. The flap deflections required for trim substantially coincide with variable camber deflections needed to minimize drag due to lift.

Outboard control surface wings have been studied by NACA as disclosed in NACA Research Memorandum RML58B06 by William C. Sleeman, Jr. entitled "Preliminary Study of Airplane Configuration Having Tail Surfaces Outboard of The Wing Tips", and the insensitivity of trim drag to stability margin was verified and advocated by NACA. However, their wings exhibited severe non-linearities in static stability through the angle of attack range which contraindicated their practical application. The reasons for this deficiency were that wing tip pods carrying the "outboard tails", in NACA parlance, interfered with the development of the tip vortices, and that an inboard migration of the tip vortices occurred. The two effects deprived the outboard tails from the desirable vortex flow field and caused them to stall prematurely.

The present wing and outboard control overcomes these deficiencies by its unique geometric relationship of wing planform and outboard control surfaces and, by maintaining control over the development of the wing side edge vortices. The present invention encompasses the design space for an outboard control surface wing in which acceptable aerodynamic characteristics, as outlined above, are achieved. The deviation from the wing as shown in FIG. 1 include small excursions in wing aspect ratio, taper ratio and sweep and control surface planform parameters and size, relative to wing. Design variations of the outboard control surfaces also include dihedral and the addition of lower outboard vertical tails, and different flap geometries including a dual flap arrangement. In the latter case the fore and aft flaps attached to a common hinge can deflect as a unit (leading edge down/trailing edge up) or provide a chambered surface (leading edge down/trailing edge down).

Referring now to FIGS. 3A, 3B, 3C and 3D, an alternate embodiment of an outboard control surface 18a is shown. The control 18a is similar to the control 18 shown in FIGS. 1-2, but does not extend immediately behind the rear portion of the main wing 12a. That space is occupied only by the trailing edge flap 16a. The mount 34a mounts the panel 28a to the wing side edge 26a for pivotal movement as a spindle. Also in the embodiment shown, the panel 28a has an axis of rotation B offset from the axis of rotation of the trailing edge flap 16a.

Referring now to FIGS. 4A, 4B, 4C and 4D, an alternate embodiment of an outboard control surface 18b is shown. The control 18b is similar to the control 18 shown in FIGS. 1-2, but only comprises two surface components, not three. The control 18b has a panel 28b and a forward flap 30b, but no rearward flap. The connection of the forward flap 30b to the panel 28b is a hinge coaxial with the mount 34b. The panel 28b and forward flap 30b are independently deflectable relative to each other and the main wing 12b.

Referring to FIGS. 5A, 5B, 5C and 5D, an alternate embodiment of an outboard control surface 18c is shown. This embodiment is similar to that shown in FIGS. 4A-4D, but the connection of the forward flap 30c to the panel 28c is not coaxial with the mount 34c.

Referring to FIGS. 6A, 6B, 6C and 6d, an alternate embodiment of an outboard control surface 18d is shown. This embodiment is similar to the embodiment shown in FIGS. 3A-3D, but comprises only a panel 28d and forward flap 30d; not a reward flap. Also in this embodiment, the forward flap 30d is connected to the panel 28d coaxial with the spindle mount 34d.

Figure 7:
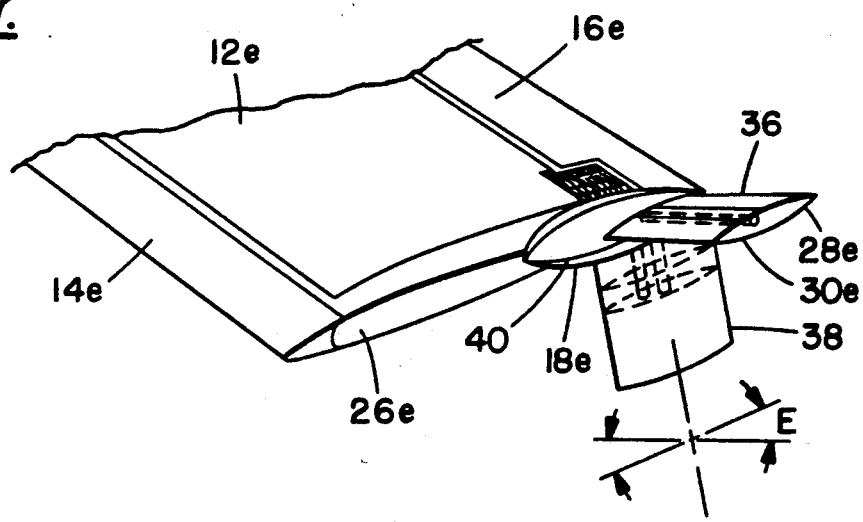
FIG. 7 is a partial perspective view of a wing tip of an aircraft having an alternate embodiment of an outboard control surface incorporating features of the present invention.
Figure 8:
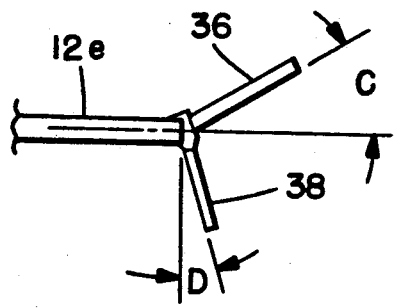
FIG. 8 is a schematic front view of the wing tip and outboard control surface shown in FIG. 7.

FIGS. 7 and 8 show an alternate embodiment of the invention which includes a dihedral and the addition of a lower outboard vertical tail. The outboard control surface 18e has a horizontal section 36, a vertical section 38, and a spindle 40.

In the embodiment shown, the horizontal section 36 is similar to the embodiment shown in FIGS. 4A-4D, but also allows rotation of the entire horizontal section 36 as shown by angle C relative to the plane of the main wing 12e. In a preferred embodiment, the angle C is about 30°. The vertical section 38 is movable in two directions. The vertical section 38 can be rotated about its axis as shown by angle E, or can be swiveled an angle D relative to the plane of the main wing 12e. In a preferred embodiment, the angle D is about 15° and the angle E is about 20°. However, any suitable type of embodiment could be provided.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. An aircraft having a longitudinal axis and adopted for airborne flight through an airstream comprising:
   a main wing having a general wing plane said wing extending laterally to long side edges in alignment with the longitudinal axis of the aircraft and free of structure therealong which would interfere with tip vortex upwash formation as the aircraft moves through said airstream;
   leading edge flaps operably connected to a front portion of said main wing;
   trailing edge flaps operably connected to a rear portion of said main wing; and
   outboard control surfaces operably connected to wing tips of said main wing proximate said main wing rear portion so that as said aircraft moves through said airstream a tip vortex is created along said edge which extends along said edge producing an upwash in the region of said control surfaces for interaction therewith, said outboard control surfaces each including a forward flap and a rearward flap, at least one of said flaps for each of said outboard control surfaces being movable into and out of alignment with said plane of said main wing.

2. An aircraft as in claim 1 wherein said outboard control surfaces each comprise a center panel between said forward and rearward flaps.

3. An aircraft as in claim 2 wherein said panels are pivotably connected to said main wing.

4. An aircraft as in claim 1 wherein said forward and rearward flaps are pivotably connected to each other.

5. An aircraft as in claim 1 wherein said rearward flaps extend behind said main wing rear portion.

6. An aircraft as in claim 4 wherein said rearward flaps are pivotably connected to said main wing.

7. A tailless aircraft comprising:
   a main wing having a front, a rear, and two distal wing side edges, said side edges being in alignment with the longitudinal axis of the aircraft and free of structure therealong which would interfere with tip vortex upwash formation as the aircraft moves through said airstream;
   leading edge flaps operably connected to said main wing front;
   trailing edge flaps operably connected to said main wing rear; and
   outboard control surfaces operably connected to said main wing proximate each of said wing side edges so that as said aircraft moves through said airstream a tip vortex is created along said edge which extends along said edge producing an upwash in the region of said control surfaces for interaction therewith, said outboard control surfaces each having two movable sections that are generally perpendicular to each other and movable relative to said main wing in two paths.

8. An aircraft as in claim 7 wherein said outboard control surfaces are connected to said rear of said main wing at said wing side edges.

9. An aircraft as in claim 7 wherein said sections are axially rotatable relative to said main wing.

10. An aircraft as in claim 7 wherein said sections are pivotally connected to said main wing in a same axis of rotation.

11. An aircraft comprising:
    a main wing extending laterally to side edges in alignment with the longitudinal axis of the aircraft and free of structure therealong which would interfere with tip vortex upwash formation as the aircraft moves through said airstream;
    leading edge flaps operably connected to said wing;
    trailing edge flaps operably connected to said wing; and
    outboard control surfaces connected to distal ends of said wing so that as said aircraft moves through said airstream a tip vortex is created along said edge which extends along said edge producing an upwash in the region of said outboard control surfaces for interaction therewith, said outboard control surfaces each having two independently movable flaps, a forward flap and a rearward flap, said forward and rearward flaps being movable into and out of alignment with a plane of said wing.

12. An aircraft as in claim 11 wherein said outboard control surfaces comprise a center panel between said forward and rearward flaps.

13. An aircraft as in claim 12 wherein said panels are pivotally connected to said wing.

14. An aircraft as in claim 11 wherein said forward and rearward flaps are pivotally connected to each other.

15. An aircraft as in claim 11 wherein said rearward flaps extend partially behind said wing.

16. An aircraft as in claim 14 wherein said rearward flaps are pivotally connected to said wing.

* * * * *